K. G. KNAPPEN.
VEHICLE WHEEL.
APPLICATION FILED AUG. 7, 1920.

1,383,405.

Patented July 5, 1921.

Inventor
Karl G. Knappen

By H.L. & C.L. Reynolds
Attorneys

UNITED STATES PATENT OFFICE.

KARL G. KNAPPEN, OF SEATTLE, WASHINGTON.

VEHICLE-WHEEL.

1,383,405.	Specification of Letters Patent.	Patented July 5, 1921.

Application filed August 7, 1920. Serial No. 401,868.

*To all whom it may concern:*

Be it known that I, KARL G. KNAPPEN, a citizen of the United States of America, and resident of the city of Seattle, in the county of King and State of Washington, have invented certain new and useful Improvements in Vehicle-Wheels, of which the following is a specification.

My invention relates to vehicle wheels of a type employing demountable rims. It also relates to that type of wheels which employ a wheel center having spoke members which diverge toward the hub and in which the rim is secured to the wheel center by expanding the wheel center and released by contracting the wheel center, which expansion and contraction is secured by bringing closer together or separating the hub ends of the spoke members.

One object of my invention is to provide a construction for the center or spoke portions of wheels of this type which will be more easily expanded and contracted when securing and removing the wheel rim and also one which will facilitate engaging it with and disengaging it from the rim, so that this may be positively and conveniently secured. Another object is to provide a construction in which the removal of the wheel body from the axle may be conveniently secured.

Other objects of my invention may be seen from a study of the following specification and the features thereof which I deem to be novel and upon which I desire to secure patent, will be particularly defined by the claims terminating this specification.

In the accompanying drawings I have shown the type of construction which I prefer to employ for this purpose.

Figure 1:
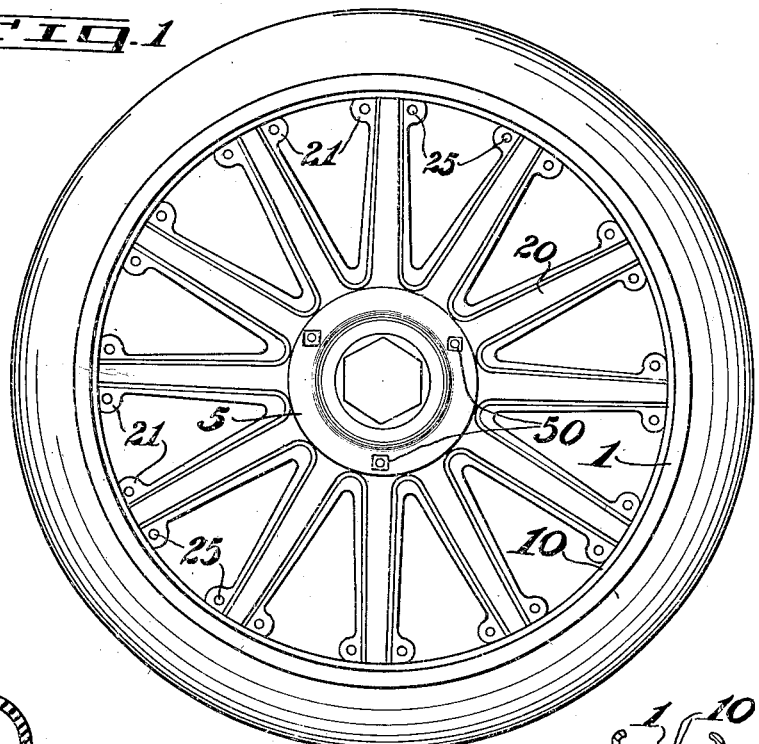
Figure 1 is a side view of a wheel constructed in accordance with my invention.
Figure 2:
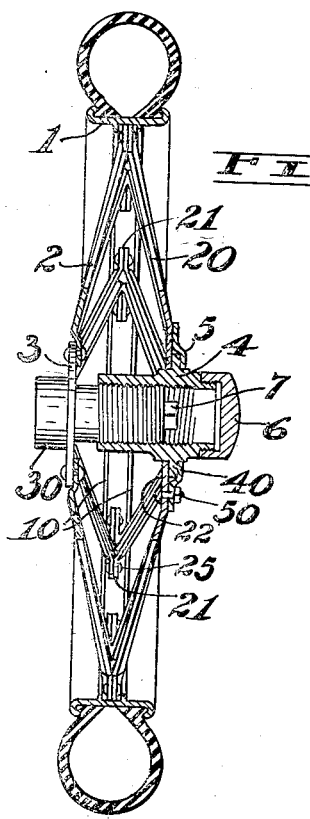
Fig. 2 is a transverse section of the same wheel, taken upon a diameter of the wheel.
Figure 3:
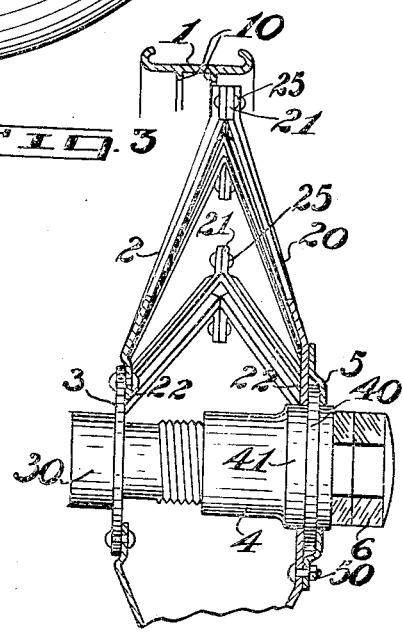
Fig. 3 is a similar view showing the wheel center diametrically contracted in order to remove the wheel rim.

A wheel constructed in accordance with my invention has three separate parts, namely, the rim, the wheel center, and the hub. Each of these parts may, of course, be a complex construction. The rim 1 may be of any suitable construction which has formed therein what is the equivalent of a groove or recesses in its inner peripheral surface, with which the outer peripheral portion of the wheel center may be engaged to secure the rim in place. This, in the construction illustrated, is a groove or channel formed by two ribs 10, which extend entirely about the inner periphery of the rim. This groove should preferably be made of such a width as to easily receive and snugly hold the outer periphery of the wheel center. Other details of the construction of the rim member are largely immaterial, provided those above mentioned are retained.

The wheel center is composed of two sets of spoke members, 2 and 20. These two sets are essentially alike. In the construction illustrated each set is supposed to be cut from a metal disk and shaped into the form shown. The two sets have spokes placed oppositely and secured together at their outer ends, as by rivets 25 passing through ears 21.

The wheel centers illustrated are provided with a central or hub band 22, which connects all the spokes of each group. The outer ends of the successive spokes or sets of spokes are disconnected so as to be free to separate as necessary when expanding it in securing it in the rim. One of the groups, being the group 2 as illustrated, is permanently secured to a flange 3 which is either fixedly or removably carried by the hub 30. This set of spoke members would normally be placed at the side of the wheel which is inward, or next to the car.

The other set of spoke members, 20, which form the wheel center, are carried by a member which is a part of or secured to the hub of the wheel, but these are movable in the direction of the axis of the wheel, to thereby separate or draw together the two groups of spoke members. As illustrated a sleeve 4 is mounted to screw upon the hub cylinder 30 and this is provided with a radially extending flange 40 which bears against one side face of the central band 22 of one group of spoke members. This adjustable sleeve is provided with a spoke seat 41, adapted to engage with the central bore or opening in the band 22 which joins the spoke members. The radial thrust transmitted through this group of spoke members is thereby carried by the sleeve 4. The sleeve 4 is, of course, rotative within the band 22, as may be necessary to permit rotation of the sleeve in the act of expanding or contracting the wheel center.

The flange 40, of itself and in conjunction with the parts which have been described, will serve to draw together the inner ends of the two sets of spoke members, but will not positively secure the separation of the inner ends of the two spoke members, if the sleeve 4 be turned so as to withdraw it. I have found by experience, that in wheels of this type, when the wheel center has been expanded by drawing the inner ends of the two parts thereof toward each other, they will not always separate of their own resiliency as may be necessary to permit removal of the rim 1. This has produced considerable practical difficulty in the convenient handling of the wheels of this type.

To remedy this difficulty I have provided means whereby the inner ends of one set of spoke members are positively engaged by the adjusting sleeve 4 so as to secure movement in either direction. This, in the drawing, has been shown as secured by applying a collar or flange 5 to the central band 22 of one set of spoke members. This flange is cupped enough so that its inner margin lies against the outer face of the flange 40, or the face opposite to that which is engaged by the central band 22. This collar may be secured to the spoke members in any convenient manner, as by means of bolts 50. It is evident that when the adjusting sleeve 4 is thus secured to its half of the wheel center, the expansion and contraction of the center may be positively secured and there can be no difficulty in the contraction of the wheel center by failure of the inner ends of the spoke members to separate sufficient to secure a ready removal of the rim.

To make it possible to easily remove the wheel as an entirety from the wheel axle, I have made the sleeve 4 open at its outer end and have closed this opening by a cap 6 which screws thereon. This makes it possible to easily get at the nut 7 by which the wheel hub is secured on the axle, to thereby readily remove the wheel as a whole whenever desired.

The wheel center herein illustrated, not having any rim connecting the outer end of the spokes, may be easily expanded and contracted. By removing the hub cap from the hub sleeve, the nut which holds the wheel upon the axle becomes accessible and the wheel as a whole may be removed without changing the adjustments of its parts.

What I claim as my invention is:

1. A wheel comprising a rim, a center having two sets of spoke members diverging toward the hub, a hub having a bearing for one set of spokes, a hub sleeve for the other set of spokes carried upon and adjustable lengthwise of the hub, and open at its outer end, said bearing member being provided with means for engaging the spokes to positively move them in both axial directions to thereby expand and contract the wheel center for engagement and disengagement with the rim, and being threaded at its outer end for the reception of a hub cap.

2. In a wheel, in combination, a rim and a center adapted to be engaged and disengaged by expansion and contraction of the center, said center having two groups of spokes, the spokes of each group being integrally connected at their inner ends, and the two groups being axially separated toward the hub and connected at their outer ends, means for fixedly securing one group of spokes to the hub, and a sleeve screwing upon the hub and carrying flanges engaging both an inner and an outer side face of the other group of spokes whereby the inner ends of the two groups of spokes may be positively moved toward and away from each other to thereby expand and contract the spokes radially and with reference to the rim, and a hub cap securable upon the outer end of said sleeve.

3. A wheel comprising a rim, a center, said rim and center having interlocking parts engageable by radial expansion of the wheel center, said center having two groups of diverging spokes, the outer ends of the spokes in each group being independent and the groups of spokes being connected at their outer ends, a hub to which one set of spokes are secured, and an axially adjustable hub sleeve provided with a flange engaged by one side face of the spokes of the other group, and a ring carried by this group of spokes and engaging the other side face of said flange, whereby one set of spokes may be positively moved toward or from the other to thereby expand or contract the peripheral line including the ends of the spokes to secure the wheel center to its rim or to dismount it therefrom, and a hub cap threaded upon the outer end of said sleeve.

4. A wheel having a center composed of two spoke sections diverging from the rim toward the hub and movable at the hub toward and from each other to vary their outside diameter, a hub to which one spoke section is fixed, a hub sleeve threaded upon the hub and having a peripheral bearing for the other spoke section and a radial flange having a thrust engagement with one side face of the spoke section, said sleeve having an open outer end, a hub cap closing the outer end of said sleeve, and a ring secured to the spoke section and bearing upon the other side face of said radial flange.

5. A wheel comprising a rim, a center composed of two sets of spokes, each set being connected at their inner ends by an integral band, the outer ends of the spokes having ears at their sides, the two sets of spokes being connected by rivets through said ears, a hub to which one set of spokes are fixedly secured, a hub sleeve screwing upon the hub and having a peripheral seating surface for the inner edge of the central connecting ring of the other set of spokes and a flange engaging one side face of the same ring, and a collar secured to the spoke center and engaging the other side face of said flange.

6. A wheel comprising a rim and a center, the latter having two groups of spokes, the spokes of each group being secured together at their hub ends and unsecured at their outer ends and the spokes of the two groups being secured together at their outer ends and diverging toward their inner ends, a hub to which one group of spokes are fixed, a sleeve adjustable lengthwise of the hub and having both radial and side thrust bearings for the center of the spokes of the other group, and a cap closing the outer end of said sleeve.

Signed at Seattle, King county, Washington, this 30th day of July 1920.

KARL G. KNAPPEN.